Dec. 22, 1970  R. J. KRUGER  3,548,441
WINDOW CLEANING SYSTEM

Filed May 22, 1969

INVENTOR.
Robert J. Kruger
BY John R. Faulkner
E. Dennis Connor
ATTORNEYS

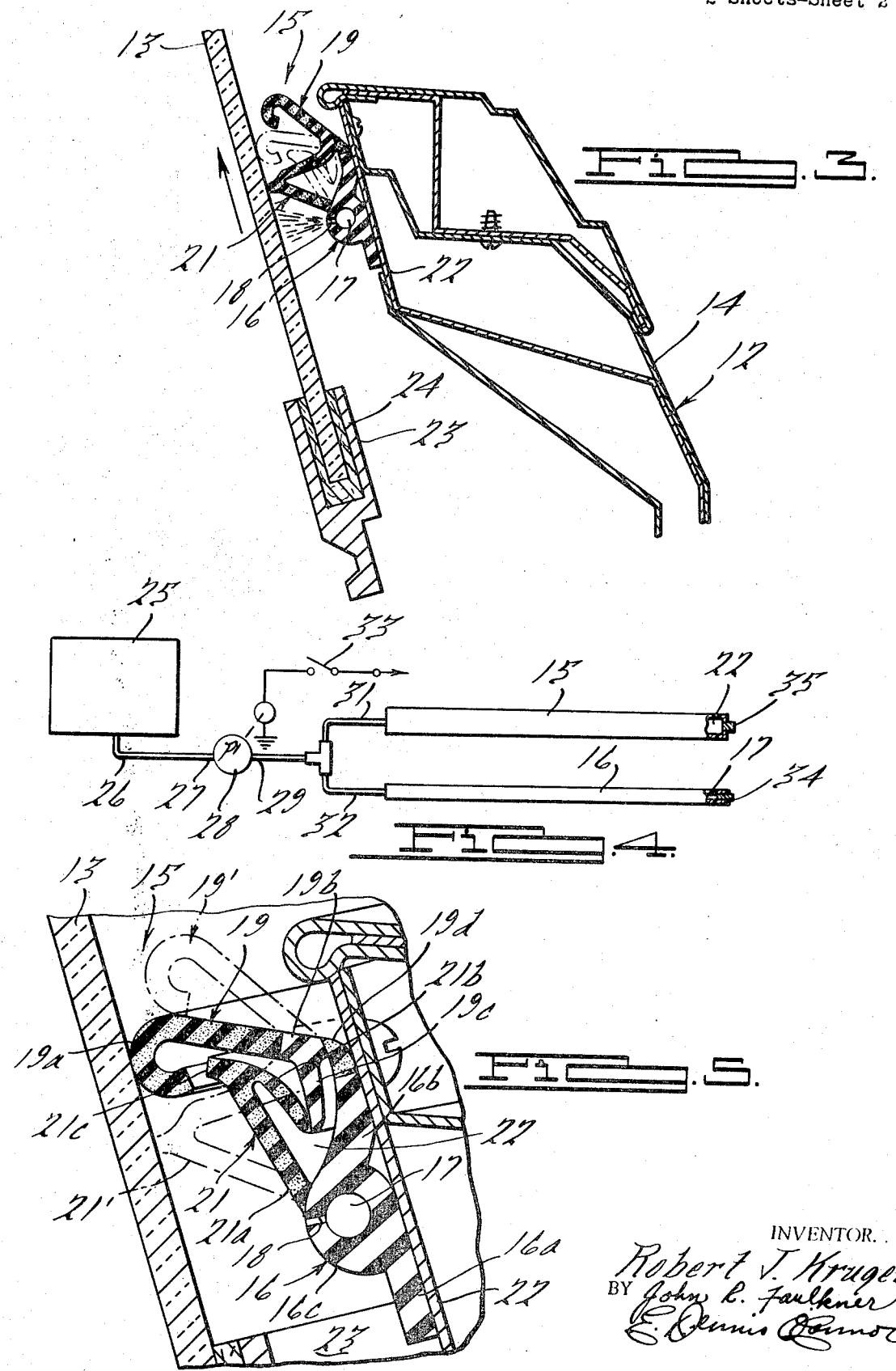

United States Patent Office 3,548,441
Patented Dec. 22, 1970

3,548,441
WINDOW CLEANING SYSTEM
Robert J. Kruger, Ann Arbor, Mich., assignor to Ford Motor Company, Dearborn, Mich., a corporation of Delaware
Filed May 22, 1969, Ser. No. 826,955
Int. Cl. B60s 1/46
U.S. Cl. 15—250.01
8 Claims

ABSTRACT OF THE DISCLOSURE

A window cleaning system comprising an elongate elastomeric member having a main body and carrying both a squeegee and a weather strip and extending substantially across the width of a movable window. Integrally formed with the elastomeric member is a fluid dispensing conduit having a plurality of spray apertures. Washer solvent fluid under pressure is utilized to inflate the elastomeric member and is dispersed through the spray apertures. During inflation, the elastomeric member moves from a configuration in which the weather strip makes a weathertight seal with the window to a configuration in which the squeegee contacts and wipes the window after the latter is wetted by dispensed solvent. This movement is made possible by the use of two different elastomeric materials having varying flexibilities in the formation of the integral elastomeric member.

BACKGROUND OF THE INVENTION

The reciprocable rear window of one popular type of vehicle body, the station wagon, has long presented a problem with regard to the maintenance of clear vision through the window. The windshield of a vehicle can be cleaned by liquid sprayed thereon and squeegeed by the windshield wipers. The side windows are in the main protected from dust accumulation by the air stream created by the vehicle movement. The substantially vertical rear window of a station wagon, however, is in a low pressure area of the air stream over the vehicle body. Even if wind deflectors are used on the rear of the vehicle, the window still has a particular affinity for collecting dirt and grime.

It has been proposed to mount on the vehicle body fluid spray nozzles that are directed toward the rear window and to provide conventional type windshield wiper blade mechanism for removing the wetted dirt and grime from the window surface. Such an arrangement has several disadvantages. The wiper area of oscillating windshield wiper blades of the type used on the front windshields of vehicles is somewhat limited. This limited wipe pattern becomes particularly noticeable when such wipers are used on the large rear windows used in station wagon tailgates. Also, complex controls must be incorporated into the system to insure that washer fluid is not squirted into the vehicle interior or that the wiper blades are not actuated when the window is in a lowered position.

Preferably, the fluid dispensing apparatus and the wiper blade or squeegee supporting means should be protected from possible damage when the tailgate is in a cargo or load carrying position. This is difficult to do with the oscillating type wiper systems.

United States patent application 810,580 filed Mar. 26, 1969, and assigned to the assignee of this invention discloses a rear window washing and wiping cleaning system for a station wagon rear window having its components constructed and arranged to avoid the disadvantages of known systems. The system of application 810,580 is concealed and protected within the rear window well and includes a fluid dispensing conduit and an inflatable member carrying a squeegee that wets and wipes the window as it moves.

It is an object of the present invention to provide a rear window washing and wiping cleaning system having the advantages of the system disclosed in application 810,580, but that provides a novel elastomeric, inflatable member that easily and economically may be formed of diverse materials and that includes an integrally formed fluid dispensing conduit.

SUMMARY OF THE INVENTION

A window cleaning unit constructed in accordance with this invention is adapted for the cleaning of a window movable into and out of a window well defined by plural structural means such as body panels of a motor vehicle. The window cleaning unit includes an elongated inflatable member secured to one of the structural means proximate to a window surface. The inflatable member includes a first portion comprising a main body, a second portion comprising a weather strip and a third portion comprising a squeegee. The weather strip and squeegee extend from the main body, are movable relative to the main body and are formed from a material that relatively is more flexible than the material of the main body. The first, second and third portions cooperate to define a chamber that is interconnected with a fluid reservoir and fluid pressurizing means operative to force pressurized fluid into the chamber to inflate the member. The member has a deflated configuration with the weather strip in contact with the window surface and the squeegee remote from the window surface and an inflated configuration wherein the weather strip is remote from the window surface and the squeegee is in contact with the window surface. Extending through the first portion or main body of the inflatable member is a fluid dispensing conduit having a plurality of spray apertures formed therethrough and positioned contiguous to the main body. The conduit is interconnected with the reservoir and the fluid pressurizing means.

DESCRIPTION OF THE DRAWINGS

Other objects, advantages and features of the present invention can be made more apparent as this description proceeds, reference being had to the accompanying drawings, wherein:

FIG. 3 is a view in part similar to FIG. 2 illustrating the parts of the window cleaning system in a second position of operation;

FIG. 4 is a diagrammatic view illustrating the inflatable member chamber and fluid dispensing conduit coupled to the fluid pressurizing means; and FIG. 5 is an enlarged view of the elastomeric inflatable member illustrated in FIGS. 2 and 3.

DETAILED DESCRIPTION OF THE INVENTION

Figure 1:
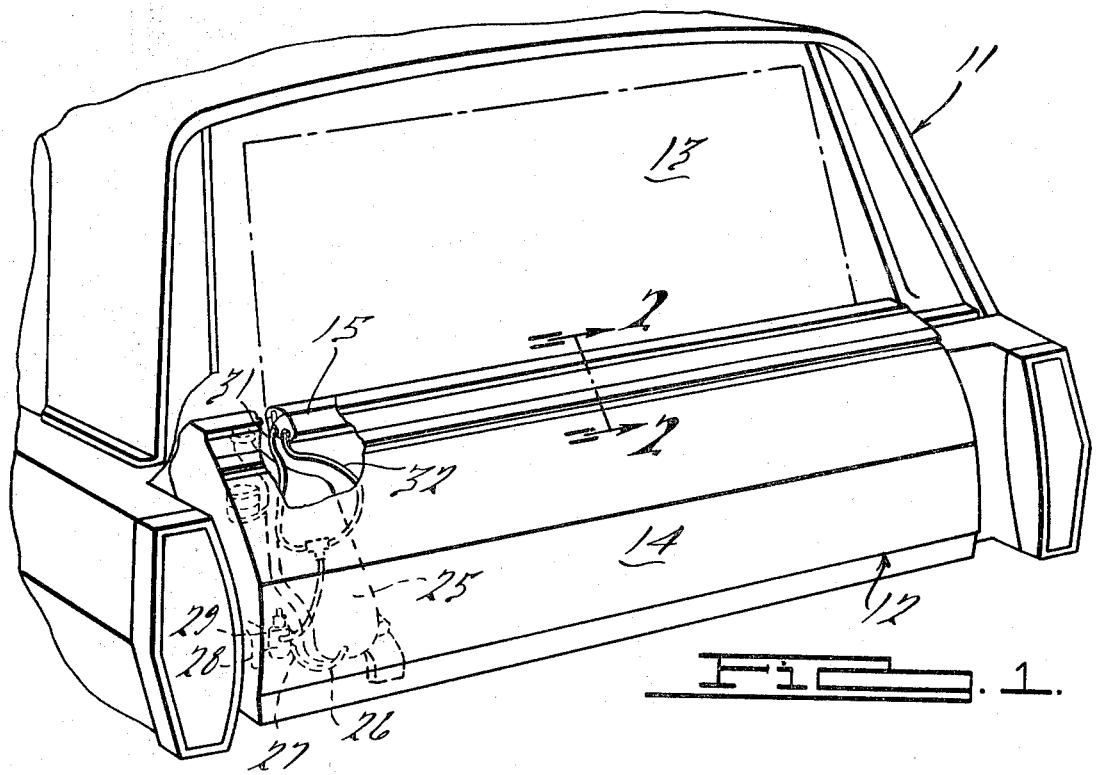
FIG. 1 is a fragmentary perspective view of the rear end of a vehicle body of a station wagon type illustrating the environment in which the present invention is to be used.

Referring now in detail to the drawings, and more particularly to FIG. 1 thereof, there is illustrated a rear end of a station wagon body 11 fitted with a tailgate 12 having a window 13 that may be lowered into or raised out of a window well formed by conventional inner and outer panels of the tailgate. Only the outer panel 14 is visible in the drawings. The mechanism for lowering and raising the window forms no part of the present invention and it will be understood that any conventional power window regulator mechanism may be used.

The window cleaning unit for cleaning the window 13 includes an elongated elastomeric member, generally designated 15. The elastomeric member 15 is a composite hollow extrusion of two distinct elastomeric materials such as polypropylene plastics, rubber materials or mixtures thereof. An appreciation of the significance of the precise formation of member 15 best can be had by reference to FIG. 5 of the drawings.

The elastomeric member 15 includes a base or main body 16 having a pair of foot portions 16a. Located between the foot portions is an arcuate portion 16c defining an elongated fluid conduit 17. A plurality of fluid dispensing aperatures 18 are formed in arcuate portion 16c along the length of main body 16. The main body 16 is formed from a first elastomeric material that, although flexible, is relatively stiff and offers significant resistance to deformation.

Extending from foot 16b of main body 16 is a weather strip portion 19 of the elastomeric member. This weather strip portion 19 has a hook shaped end portion 19a with a convex surface 19b adapted to sealingly contact a surface of window 13 or other structure as will be explained in greater detail below. Hook shaped end portion 19a is formed from a second, more easily deformed elastomeric material than is main body 16 in order to promote deformation of portion 19a, which deformation promotes a weathertight seal against structure contacted by the weather strip. Adjacent end portion 19a is an intermediate portion 19b that includes a projection 19c extending therefrom. Portion 19b, including the projection, is formed from relatively stiff elastomeric material as is main body 16 for reasons that will be explained in detail below. The connection between weather strip 19 and foot 16b comprises a junction portion 19d formed from relatively soft and easily deformed elastomeric material.

A squeegee 21 carried by member 15 includes a first legs 21 extending from arcuate portion 16c of main body 16, a second leg 21 extending from projection 19c and a wiping element 21c formed at the intersection of the legs 21a and 21b. Squeegee 21 is formed in its entirety of relatively soft and easily deformed elastomeric material. Squeegee 21 cooperates with main body 16 and weather strip portion 19 to define a chamber 22 extending the length of elastomeric member 15. As will be treated in greater detail below, chamber 22 becomes enlarged upon the admittance of pressurized fluid thereto. It thus may be seen that member 15 is inflatable along its entire length.

Elastomeric member 15 is secured to a sill structure wall 22 of outer tailgate panel 14 by any suitable means such as adhesive or conventional fasteners. The vertical location of member 15 on wall 22 is such that convex surface 19b of weather strip portion 19 will register with a surface 23 of a window frame 24 so as to function as a seal in the window well gap between the window structure and sill structural wall 22 when the window structure is in the raised position (not illustrated).

Referring now to FIGS. 1 and 4, reservoir 25 adapted to contain window washer solvent is coupled by a hose or tubing 26 to the intake side 27 of an electrically driven pump 28. The discharge side 29 of the pump is coupled by parallel branch tubing sections 31 and 32 to the elongated elastomeric member such that tubing section 21 communicates with chamber 22 and tubing section 32 communicates with fluid conduit 17. The energization of the pump is controlled by a switch 33 located in a position convenient to the vehicle operator.

Figure 2:
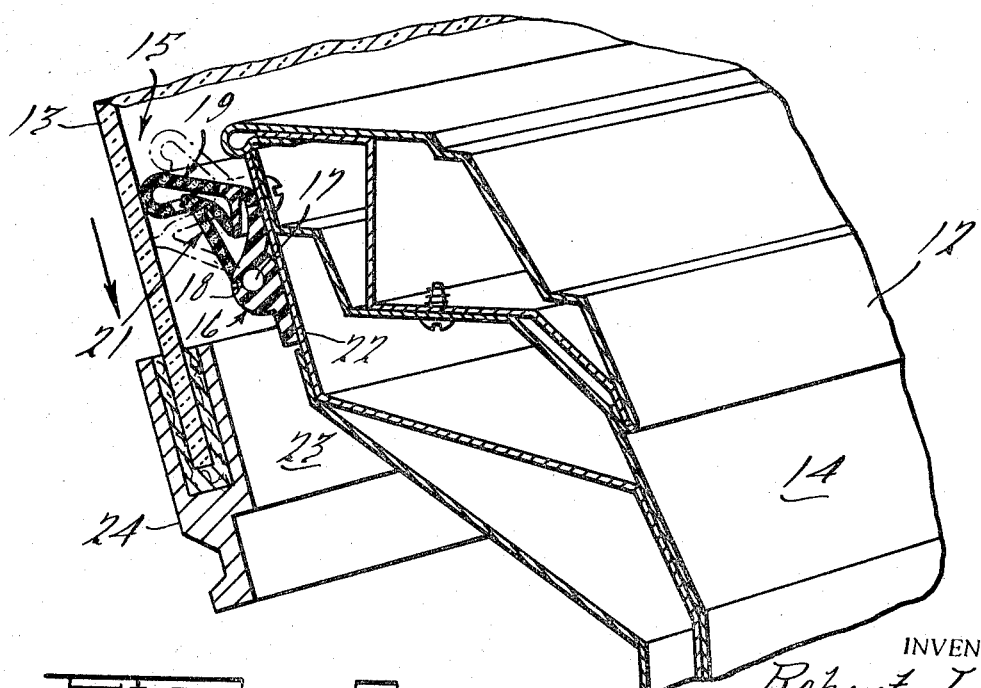
FIG. 2 is a section view taken along the line 2—2 of FIG. 1.

The operation of the window cleaning system embodying the present invention is as follows:

When window 13 and attendant structure are in the normal raised position, not illustrated, sealing contact is made between face 23 of window frame 24 and convex surface 19b of weather strip 19 as described above. This contact results in a relatively large deformation of portion 19 of elastomeric member 15. With window 13 in a lowered position, such as is illustrated in FIG. 2 of the drawings, the sealing engagement caused by convex weather strip portion 19b is continued although this engagement now is made with the exterior surface of window 13 with less of a deformation of the weather strip portion 19. Thus, with window 13 in a fully raised or lowered position, elastomeric member 13 provides a seal between this window structure and the window well.

If a cleaning of the exterior surface of window 13 is desired, the vehicle operator closes switch 34, thereby energizing pump 28 such that fluid from reservoir 25 is pressurized and directed to both fluid conduit 17 and chamber 22. Chamber 22 is closed at 35 at its end remote from tube 21 such that pressurized fluid entering into the chamber has nowhere to go and thus exerts a pressure on the structure defining the chamber inflating the member 15. The pressure exerted on projection 19c of weather strip 19 causes the weather strip 19 to rotate in a clockwise manner, as viewed in FIG. 5 of the drawings, about the soft elastomeric material forming the junction portion 19d. Since the material of junction portion 19d is relatively easily deformable, compression of this material is possible by the pressure within chamber 22 such that weather strip portion 19 is rotated into the position as shown in ghost and designated by the numeral 19'.

Simultaneously with the movement of the weather strip portion 19, the pressure acting within the chamber 22 causes a movement of legs 21a and 21b of squeegee portion 21. This movement includes swinging movement in a counterclockwise direction, as viewed in FIG. 5, of leg 21a about the junction point between this leg and arcuate portion 16c of main body 16. This movement of the legs of squeegee portion 21 results in the squeegee portion assuming the position shown in ghost and designated by the numeral 21', wherein the wiping element 21 is in intimate contact with the exterior surface of window 13. The fact that squeegee portion 21 is made of relatively easily deformable material allows a firm and even contact between wiping element 21c and window 13 to facilitate the removal of dirt and road grime from the window surface.

Pressurized window cleaning solvent that passes into conduit 17 through tubing 32 is trapped by the closing off of chamber 17 as at 35 as seen in FIG. 4. This fluid is forced through apertures 18 and onto the surface of window 13. As may be seen from FIG. 3 of the drawing, the solvent exiting conduit 17 through apertures 18 contact window 13 below the point whereat squeegee 21 contacts window 13. This provides that during upward movement of window 13, the window will first be contacted by cleaning solvent wherein dirt and grime are loosened, whereafter the window is squeegeed by wiping element 21c such that a cleaning of the window is accomplished. Actuation of the pressurizing pump thus preferably should be confined to times of upward window movement.

With optimum window cleaning occurring only during the upstroke of the window, it may be necessary to repeat up and down movement of the window several times to insure that the window adequately is cleaned. Although the circuitry is not shown, it is believed readily apparent that the pump motor switch 33 may be placed in series with the tailgate window operating switch so that the pump motor may be energized only when the window lifting mechanism operating switch is actuated to raise the window.

Upon switch 33 being opened, pump 28 is stopped and the pressure in the system rapidly diminishes due to pressure relief through apertures 18. Since junction portion 19d of weather strip 19 previously was compressed by the pressure existing within chamber 22, this junction portion now exerts a force that returns the parts of elastomeric member 15 into the positions shown in FIGS. 2 and 5.

I claim:

1. A window cleaning unit for a window movable into and out of a window well defined by plural structural means, said unit comprising: a member secured to one of said structural means proximate to a window surface, said member being formed from flexible material; weather strip means extending from said member and attached thereto; squeegee means attached to both said weather strip means and said member; said weather strip means normally being in contact with said surface and said squeegee means normally being remote from said surface; said weather strip means and said squeezee means being formed from material having relatively greater flexibility than the material of said member; said member, weather strip means and squeezee means cooperating to define an expandable chamber, said chamber being interconnected with a fluid reservoir and fluid pressurizing means operative to force pressurized fluid into said chamber to expand said chamber; expansion of said chamber causing movement of said weather strip means out of contact with said surface and movement of said squeegee means into contact with said surface.

2. A window cleaning unit according to claim 1, said member having a fluid conduit formed therein connected to said fluid reservoir and said fluid pressurizing means, said conduit having fluid dispensing apertures formed therethrough for directing fluid onto said window.

3. The window cleaning unit of claim 2, said member, weather strip means and squeegee means being integrally formed.

4. A window cleaning unit for a window movable into and out of a window well defined by plural structural means, said unit comprising: an elongated inflatable member secured to one of said structural means proximate to a window surface; said inflatable member having a first portion comprising a main body, a second portion comprising a weather strip and a third portion comprising a squeegee; said second and third portions extending from said first portion, being movable relative thereto and being formed from a material that relatively is more flexible than the material of said first portion; said first, second and third portions cooperating to define a chamber; said chamber interconnected with a fluid reservoid and fluid pressurizing means operative to force pressurized fluid into said chamber to inflate said inflatable member; said inflatable member having a deflated configuration with said second portion in contact with said window surface and said third portion remote from said surface and an inflated configuration with said second portion remote from said surface and said second portion in contact with said surface.

5. A window cleaning unit according to claim 4, wherein said fluid reservoir comprises a reservoir of washer solvent, said unit further comprising a fluid dispensing conduit having a plurality of spray apertures formed therethrough and positioned contiguous to said first portion, said conduit being interconnected with said reservoir and said first pressurizing means.

6. A window cleaning unit according to claim 5, wherein said inflatable member and said fluid dispensing conduit are integrally formed.

7. A window cleaning unit for a window movable into and out of a window well defined by plural structural means, said unit comprising: an elongated inflatable member secured to one of said structural means proximate to a window surface, said inflatable member having a first portion comprising a weather strip and a second portion comprising a squeegee, said inflatable member having a deflated configuration wherein said weather strip contacts said window surface to form a weathertight seal therebetween and said squeegee is remote from said surface, said inflatable member having an inflated configuration wherein said squeegee contacts said surface and said weather strip is remote from said surface, a fluid dispensing conduit having a plurality of spray apertures formed therethrough and positioned along said one structural means contiguous to said inflatable member, a reservoir of washer solvent connected to said fluid dispensing conduit and said inflatable member, and pump means operative to pressurize the washer solvent for dispersal through said spray apertures and to inflate said inflatable member from said deflated configuration to said inflated configuration, said inflatable member having a main body formed from a first material, said weather strip and said squeegee extending from said main body and being connected thereto by a junction of a second material of greater flexibility than said first material and forming hinge means enabling movement of said weather strip and squeegee relative to said main body, said window surface being wetted and wiped upon movement past the fluid dispensing conduit and squeegee.

8. The window cleaning unit of claim 7, said inflatable member and said fluid dispensing conduit being integrally formed.

References Cited

UNITED STATES PATENTS

| | | | |
|---|---|---|---|
| 1,982,345 | 11/1934 | Kirby | 15—103X |
| 2,666,941 | 1/1954 | Oishei | 15—250.1 |
| 3,431,577 | 3/1969 | Minsky | 15—250.04 |

ROBERT W. MICHELL, Primary Examiner

U.S. Cl. X.R.

15—103, 250.1, 250.19